United States Patent
Matsumoto et al.

(10) Patent No.: US 10,424,776 B2
(45) Date of Patent: Sep. 24, 2019

(54) METHOD FOR MANUFACTURING ELECTRODES USING THREE-DIMENSIONAL SUBSTRATE FOR ELECTROCHEMICAL APPLIED PRODUCTS

(71) Applicants: M&G Eco-Battery Co., Ltd., Osaka-shi (JP); Japan Capacitor Industrial Co., Ltd., Fussa (JP)

(72) Inventors: Isao Matsumoto, Osaka (JP); Hua Zhou, Osaka (JP); Koji Yoshioka, Fussa (JP)

(73) Assignee: Japan Capacitor Industrial Co., Ltd., Fussa (JP)

( * ) Notice: Subject to any disclaimer, the term of this patent is extended or adjusted under 35 U.S.C. 154(b) by 0 days.

(21) Appl. No.: 14/962,275

(22) Filed: Dec. 8, 2015

(65) Prior Publication Data

US 2016/0172662 A1    Jun. 16, 2016

(30) Foreign Application Priority Data

Dec. 11, 2014   (JP) ................................. 2014-250809

(51) Int. Cl.
*H01M 4/04* (2006.01)
*H01M 4/50* (2010.01)
(Continued)

(52) U.S. Cl.
CPC ....... *H01M 4/0478* (2013.01); *H01M 4/0402* (2013.01); *H01M 4/0404* (2013.01);
(Continued)

(58) Field of Classification Search
CPC ............. H01M 4/0402; H01M 4/0404; H01M 4/0478; H01M 4/0409; H01M 4/0416;
(Continued)

(56) References Cited

U.S. PATENT DOCUMENTS 6,048,372 A * 4/2000 Mangahara ............. H01M 4/04
                                                    29/623.5
6,605,388 B1 * 8/2003 Goda ....................... H01M 4/70
                                                    29/2
(Continued)

FOREIGN PATENT DOCUMENTS

CN    12456875 B    9/2014
EP    1478037 A2    11/2004
(Continued)

*Primary Examiner* — Brian K Talbot
(74) *Attorney, Agent, or Firm* — The Webb Law Firm

(57) ABSTRACT

Using the generally used coating method of an active material paste to a metal foil on a 3DF made the electrode properties instable due to residual air inside of the 3DF, and had the risk of causing micro short circuit of the battery due to metal fine powder and the like adhered to the 3DF and the 3DF exposed to the electrode surface. To solve the above-mentioned, the coating of the active material paste to the 3DF was made into a two-step coating process as shown below. Step one removes the air and fills the paste at the same time by applying the paste flow from one side of the 3DF (the first step coating process). Step two coats a new paste onto the surface of the electrode obtained by step one (the second step coating process). This electrode obtained by the two-step coating process hardly has remaining air amount, can uniformly confine metallic power dust or the 3DF itself inside the electrode (the first step coating process), and in addition to this, has the capability of Li ions freely moving between the electrode surface and the depth portion of the electrode through the opening portion formed on the tip portion of the innumerable protrusions of the 3DF, the micro short circuit of the battery due to Li dendrite was prevented even in repeated charge and discharge.

17 Claims, 9 Drawing Sheets

(51) Int. Cl.
  *H01M 4/505* (2010.01)
  *H01M 4/52* (2010.01)
  *H01M 4/74* (2006.01)
  *H01M 2/02* (2006.01)

(52) U.S. Cl.
  CPC ....... *H01M 4/0409* (2013.01); *H01M 4/0416* (2013.01); *H01M 4/0435* (2013.01); *H01M 4/0492* (2013.01); *H01M 4/502* (2013.01); *H01M 4/505* (2013.01); *H01M 4/52* (2013.01); *H01M 4/742* (2013.01); *H01M 2/022* (2013.01); *H01M 2/026* (2013.01); *H01M 2/0262* (2013.01); *H01M 2220/20* (2013.01); *H01M 2220/30* (2013.01)

(58) Field of Classification Search
  CPC .. H01M 4/0435; H01M 4/0492; H01M 4/502; H01M 4/505; H01M 4/52; H01M 2/022; H01M 2/026; H01M 2/0262; H01M 2220/20; H01M 2220/30
  USPC ............................................ 427/58, 115, 402
  See application file for complete search history.

(56) References Cited

U.S. PATENT DOCUMENTS

| | | | |
|---|---|---|---|
| 6,800,399 B2 | 10/2004 | Matsumoto | |
| 2002/0025475 A1* | 2/2002 | Matsumoto | H01M 4/0404 |
| | | | 429/235 |
| 2003/0180621 A1* | 9/2003 | Matsumoto | H01M 4/0404 |
| | | | 429/233 |
| 2004/0229126 A1* | 11/2004 | Matsumoto | H01M 4/04 |
| | | | 429/233 |
| 2005/0019664 A1* | 1/2005 | Matsumoto | H01M 4/0404 |
| | | | 429/235 |
| 2012/0100432 A1* | 4/2012 | Matsumoto | H01M 4/78 |
| | | | 429/245 |
| 2013/0170099 A1* | 7/2013 | Lee | H01G 9/042 |
| | | | 361/502 |
| 2013/0189577 A1 | 7/2013 | Wang et al. | |
| 2013/0202957 A1* | 8/2013 | Nishimura | H01M 4/131 |
| | | | 429/199 |
| 2013/0236790 A1* | 9/2013 | Byun | H01M 4/505 |
| | | | 429/224 |
| 2013/0330617 A1 | 12/2013 | Yoshimura et al. | |
| 2014/0335402 A1 | 11/2014 | Minamibori | |

FOREIGN PATENT DOCUMENTS

| | | |
|---|---|---|
| EP | 2680286 A1 | 1/2014 |
| JP | 4536289 B2 | 6/2010 |
| WO | WO 01/88934 * | 11/2001 |
| WO | 2013096220 A1 | 6/2013 |

\* cited by examiner

METHOD FOR MANUFACTURING ELECTRODES USING THREE-DIMENSIONAL SUBSTRATE FOR ELECTROCHEMICAL APPLIED PRODUCTS

CROSS-REFERENCE TO RELATED APPLICATIONS

This application claims priority to Japanese Patent Application No. 2014-250809 filed Dec. 11, 2014, the disclosure of which is hereby incorporated in its entirety by reference.

TECHNICAL FIELD

The present invention relates to improving the constitution method and property of a positive electrode and/or a negative electrode used in electrochemical applied products such as secondary batteries represented by lithium-ion batteries (hereinafter called LIBs) or capacitors.

BACKGROUND ART

In accordance with the prevalence of small sized electronic equipments, nickel-hydrogen batteries (Ni/MH batteries) in the first half of the 1990s, then lithium-ion batteries (LIBs) were commercialized successively as the power source in competition with the mainly used small sized nickel-cadmium batteries. As a result, currently, the latter LIBs have come to occupy a preponderant share in general use. Moreover, motive power use secondary batteries such as hybrid vehicles (HEV, P-HEV), electric vehicles (EV) aiming to solve global environmental issues and energy issues has begun to be put into practical use. Further, motive power use secondary batteries such as hybrid vehicles (HEV, P-HEV), electric vehicles (EV) aiming to solve global environmental issues and energy issues have begun to be put into practical use. Further, secondary battery market for industrial use such as energy storage, UPS are also predicted to grow massive hereafter, thus improvement and new development of electrochemical applied products such as medium/large sized secondary batteries and capacitors as the power source has become an urgent and important issue. For these secondary batteries as the main power source in power/industrial use, formation of the market has already begun by medium/large sized nickel-hydrogen batteries (Ni/MH batteries) and lead-acid batteries being put into practical use approximately 15 years ago. However, in the future, attention is drawn to nonaqueous batteries such as LIBs excellent in respects of small size, light weight, and high voltage as becoming mainly used secondary batteries hereafter in the further growing market. In addition, capacitors possible of ultra-rapid charge and discharge and with high response speed or lithium-ion capacitors (LICs) and the like has been drawn attention to as single or combined power source with secondary batteries such as LIBs.

Since the present invention relates to improving the method for manufacturing electrodes common to these electrochemical applied products, detailed explanation will be made hereinafter with respect to lithium-ion batteries (referred to as LIBs) for convenience of explanation.

The common issues to be improved in both general use, wherein small sized though high capacity LIBs have become necessary for use such as in smartphones, and medium/large sized LIBs for power/industrial use, wherein much large-scaled power source than general use and relatively high rate charge and discharge and long-term reliability in severe operating environments are necessary, in other words the strongest demands from the market regarding batteries are improvement in properties such as further high capacity and high reliability (including safety) (hereinafter referred to as "properties") and cost reduction.

Because of this, designs for a power source system sufficiently considering high reliability from the step of battery designing are planned. Naturally, the following improvements for a primitive LIB itself have been performed from the past.

Development of a stable and low cost positive and negative electrode material contributing to "properties" improvements.

Development of a stable and low cost electrolyte, separator, and binder contributing to "properties" improvements.

Improvement in structure of the electrode and battery.

Improvement in the manufacturing process and improvement in quality control of the battery.

Consequently, currently, as the positive electrode material, other than Li compounds of Co, Mn, and Ni oxide which have been used from the past, Li compounds of iron phosphate in which low cost and heat stability are expected have begun to be put into practical use. Also, as the negative electrode material, other than carbonic materials which have been used from the past, lithium titanate ($Li_4Ti_5O_{12}$) which is durable to long-term use and is excellent in rapid charge and discharge property and safety and the like have begun to be put into practical use. However, they both still have issues on reduction in energy density, that is, to achieve high capacity in "properties". Moreover, though low cost is expected, when regarded as a finished battery, it has not yet made significant progress under the present circumstances.

As for the electrolyte, separator, and binder, improvement in high reliability of LIBs, such as improving heat resistance is made, but is basically related only to reliability in "properties".

As to improvement in structure of the battery, improvement of reliability in "properties" has been planned by preventing micro short circuit and improving the discharging method of generated gas. However, significant progress in improvement in structure of the electrode is not recognized. Naturally, development of a thick positive and negative electrode greatly relating this argument seems to have been adopted, but when an active material is coated thickly to a metal foil, increase in electrode resistance as well as electrolyte shortage in the depth portion of the electrode occur and cause difficulty in rapid charge and discharge. As a result, significant practical application of a thick electrode is difficult.

Moreover, vigorous effort has been made to improvement in the manufacturing process and quality control of the battery by each battery manufacturers from the past and remarkable progress is seen to improvement and stabilization in battery quality, but this does not fundamentally contribute to significant improvement in "properties" and cost reduction.

However, focusing once again that the root cause hindering improvement in "properties" and cost reduction mentioned above is due to conventional thin electrodes (thickness: approximately 100 μm) designed in consideration of current collecting performance of the electrode or diffusion of the electrolyte, an LIB structured by a thick electrode employing a three-dimensional electrode substrate which improves current collecting performance of the whole intra-electrode has already been suggested, see: Japanese Patent No. 4536289, U.S. Pat. No. 6,800,399, Chinese Patent No. ZL201010582391.4.

In other words, it is a thick electrode employing a three-dimensional electrode substrate (hereinafter referred to as 3DF) which improves current collecting performance of the whole intra-electrode or diffusion of the electrolyte to the depth portion of the electrode instead of a thin electrode coating an active material and the like to a two-dimensional metal foil substrate. For example, in an LIB using a thick electrode of about two times than conventional, it can at least achieve high capacity for the reduced volume since the use area of the separator or the electrode substrate is reduced by half, and due to the space with the opposite electrode adjacent to an electrode lead being extended, risks of micro short circuit caused by vibration etc. can be reduced. Moreover, since the length of an electrode or the number of electrodes is reduced by half, manufacturing the battery becomes simple and the production quantity per unit time can be increased, so cost reduction can also be expected.

However, employing the conventional production method of electrodes in which a paste of an active material is coated to a metal foil substrate as it is, had the following problems.

1. The desired property could not be stably obtained since shortage in filling amount of the active material as well as disturbance of the Li ion movement were caused due to the air existing inside of the 3DF being irremovable.

2. It had the risk of causing micro short circuit of the battery due to Li dendrites (needle-like crystals) generated on the negative electrode surface at the end of charge by metallic powder dust generated by three-dimensional processing (3DF processing) of a metal foil or conductive dust in the air and the like adhered to the 3DF being mixed into to the paste side while coating the paste of the active material and a part of the 3DF being exposed to the electrode surface breaking through the separator.

SUMMARY OF THE INVENTION

To solve these problems, the present invention provides a coating process of filling/coating a paste of an active material in two-steps. That is, the first step coating process of filling the paste while removing air inside of the 3DF, and the second step coating process of coating a new paste onto both sides of the electrode obtained by the first step.

Specifically, in the first step coating process, a liquid flow of the paste is formed in the paste tank of the active material and the paste is filled while removing air inside of the 3DF by applying the paste flow from one side of the 3DF to pass through. Then, after removing the extra paste by passing it through a slit space with a desired space opened, it is dried. In the second step coating process, after coating a new paste onto both sides of the electrode obtained by the first step, the coating amount is adjusted in the same manner and dried.

Additionally, in the first step coating process, passing through the paste by applying the paste flow again from the opposite side changing positions more certainly removes air inside of the 3DF. Moreover, in the second step coating process, the coating amount may be adjusted by passing it through a slit space after immersing the electrode obtained by the first step in a new paste tank, or may coat a desired paste amount onto both sides of the electrode with coaters generally used in conventional. Moreover, it may be coated continuously or intermittently between the first step coating process and the second step coating process using coaters exclusive for Li-ion batteries and the like.

Regarding the electrode obtained by the first step of the present invention, there are cases that metallic powder dust expose on the surface or a part of the 3DF exposes to the electrode surface, but an electrode confining metallic power dust or the 3DF inside the electrode is obtained by coating a new paste in the second step coating process. By this two-step coating process and the effect of Li ions being capable of freely moving reciprocally with the depth portion of the electrode through the opening portion of the tip portion of a fine hollow protrusion, Li dendrites are not generated even in repeated charge and discharge, so the micro short circuit of the battery can be prevented.

Regarding the present invention, step one (the first step coating process) conducts air removal and paste filling simultaneously by applying the paste flow from one side of the 3DF. Step two (the second step coating process) coats a new paste onto the surface of said electrode obtained by step one. Since this electrode obtained by the two-step coating process hardly has remaining air amount, can uniformly confine metallic power dust or the 3DF itself inside the electrode (the coated portion of step one), and in addition to this, has the capability of Li ions freely moving between the electrode surface and the depth portion of the electrode through the opening portion formed on the tip portion of the innumerable protrusions of the 3DF, the micro short circuit of the battery due to Li dendrite was prevented even in repeated charge and discharge.

Specifically, the present invention relates to a method for manufacturing electrodes using 3DF for electrochemical applied products, wherein the method for manufacturing is for the positive electrode and/or the negative electrode of electrochemical applied products with an electrode group contained and sealed in a bottomed cylindrical can, the electrode group being a long hoop state positive electrode and negative electrode spirally-rolled interposing a separator therebetween or a square plate shaped positive electrode and negative electrode laminated interposing a separator therebetween, or of electrochemical applied products with said laminated electrode group contained and sealed between a metal foil and a laminated foil of synthetic resin, said positive electrode and/or said negative electrode a. is filled and coated respectively with the active material powder (including a material absorbing a reactant) or a powder of an electrical double-layer formation in the internal space portion and on the surface of the three-dimensional substrate (hereinafter called 3DF), and b. has a process of filling the paste of the above powder to the internal space portion of the above 3DF (the first step coating process) and a process of coating the new paste of the above powder on the front and back sides of the electrode obtained by the aforementioned process (the second step coating process).

The present invention is not particularly limited, but it is desirable that said 3DF has innumerable fine hollow protrusions formed on the front and back sides of a metal foil. In particular, it is preferable that the tip portion of said innumerable fine hollow protrusions is opened. It is preferable that ultrafine, innumerable concave and convex portions or innumerable concave portions are formed on the surface layer of said 3DF. It is desirable that the surface layer of said 3DF is covered with one or more kinds of a binder or a thickener used in positive and negative electrodes or a mixture of a binder or a thickener with carbon fine particles. It is desirable that the filling of the paste of the active material powder in said first step coating process is due to a method of passing the paste through from one side of the 3DF to the opposite side.

Moreover, the present invention relates to a method for manufacturing electrodes using 3DF for electrochemical applied products, wherein the method for manufacturing is for the positive electrode and/or the negative electrode of electrochemical applied products with the electrode group contained and sealed in a bottomed cylindrical can, the electrode group being the long hoop state positive electrode and negative electrode spirally-rolled interposing a separator therebetween or the square plate shaped positive electrode and negative electrode laminated interposing a separator therebetween, or of electrochemical applied products with said laminated electrode group contained and sealed between a metal foil and a laminated foil of synthetic resin, said positive electrode and/or said negative electrode a. is filled and coated respectively with the active material powder (including a material absorbing a reactant) or the powder of the electrical double-layer formation in the internal space portion and on the surface of the three-dimensional substrate (hereinafter called 3DF), and b. has the process of filling the paste of the above powder to the internal space portion of the above 3DF (the first step coating process), c. a process of compressing by a press after drying the electrode obtained by the first step coating process, d. the process of coating the new paste of the above powder on the front and back sides of the electrode (the second step coating process) after said compression, and e. a process of compressing to a desired thickness by the press after drying the electrode obtained by the second step coating process.

In this method for manufacturing, though not particularly limited, but it is preferable that said 3DF has a structure with innumerable fine hollow protrusions formed on the front and back sides of a metal foil. In particular, it is preferable that the tip portion of said innumerable fine hollow protrusions is opened. It is preferable that ultrafine innumerable concave and convex portions or innumerable concave portions are formed on the surface layer of said 3DF. It is preferable that the surface layer of said 3DF is covered with one or more kinds of a binder or a thickener used in positive and negative electrodes or a mixture of a binder or a thickener with carbon fine particles. It is preferable that the filling of the paste of the active material powder in said first step coating process is a method of passing the paste through from one side of the 3DF to the opposite side

DETAILED DESCRIPTION OF THE INVENTION

Hereinafter, embodiments of the present invention will be explained with reference to the drawings.

Figure 1:
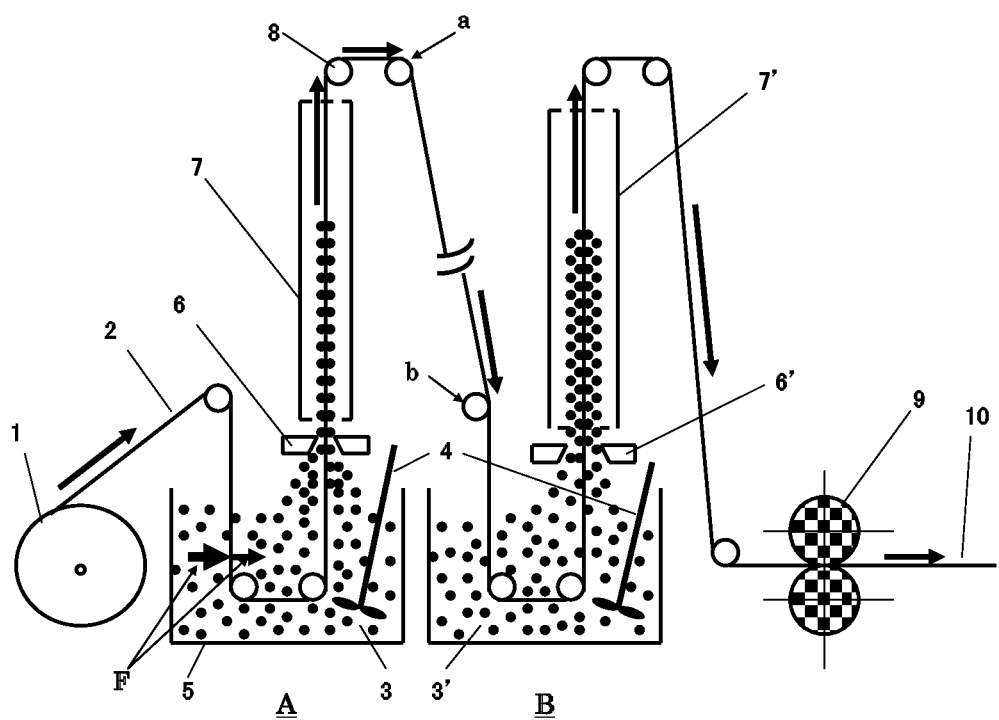
FIG. 1 A schematic manufacturing view of the electrode for an LIB in one embodiment of the present invention.

FIG. 1 shows one example of a schematic processing view of {filling/coating-drying-pressing} of the active material paste which represents the present invention and is most important in the manufacturing process of a thick electrode using a 3DF. The first step coating process of the active material paste 3 to the 3DF (mainly, the paste filling process to the inside of the 3DF) is shown in A of the figure, and the second step coating process of the active material paste 3' (the paste coating process) is shown in B of the figure. Additionally, 1 is a coil of 3DF, 2 is a hoop state 3DF. 3 is an active material paste, and 3' is a new active material paste.

In the first step coating process, a paste flow F in one direction is formed in a paste tank 5 of A and is filled inside of the 3DF while removing air inside of the 3DF by applying it from one side of the 3DF to pass through. Then, after controlling the filling/coating amount by passing it through a slit 6, it is instantly dried in a drying furnace 7. On this occasion, it is preferable to blow clean hot air into the entrance of the drying furnace 7 to prevent the fall of paste.

Here, regarding the paste flow F in one direction, it is easy to form the flow with a revolving roller or an agitating propeller and the like, but other than this method, the paste may be pumped up with a pump and sprayed from one side. Moreover, instead of the slit 6, a pair of rollers forming appropriate space may be used. The drying furnace 7 in FIG. 1 shows a vertical drying furnace which easily prevents exfoliation of the undried paste due to contacting the surroundings, but there is no problem with a horizontal type furnace if exfoliation due to contact is prevented.

The second step coating process only has to agitate the whole paste in the paste tank with, for example, the agitator 4 and the others are the same manner as the first step coating process. The electrode after the coating process is preferably pressed to a desired thickness, for example, by a roller press machine 9.

Moreover, the coherence of the 3DF and the active material may be helped by pressing the electrode between the first step and the second step, that is, between a and b in the figure. Additionally, in case of particularly producing a thick electrode, the roller diameter of the press machine is preferably not less than 400 mm diameter, which can inhibit the elongation of the electrode during press, to prevent exfoliation of the active material layer of the surface without the 3DF. 10 is a hoop state electrode.

Figure 2:
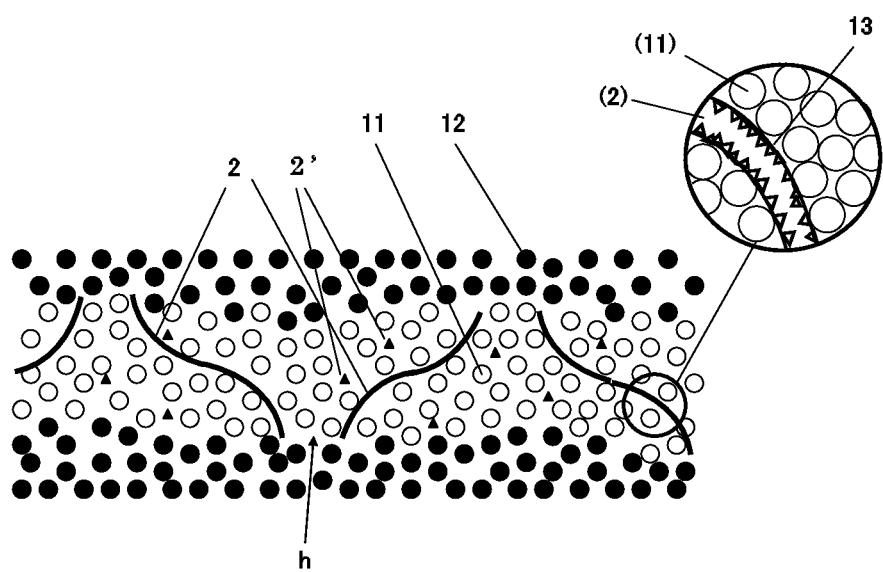
FIG. 2 A schematic cross-sectional view of the electrode in one embodiment of the present invention.

FIG. 2 shows the schematic cross-sectional view of one example of the electrode obtained by the above mentioned process. While removing air in the first step coating process, mainly the active material powder filled inside of the 3DF, in other words an internal active material powder 11, is filled inside of the 3DF to details. However, a fine powder of metal 2' generated during the processing of the 3DF or dust in the air adhered to the 3DF exists between the active material powder. A new active material powder 12, in other words a new paste of said powder, in other words a new active material powder on the surface coated in the second step coating process exists on both front and back sides of the electrode obtained by the first step and the surface layer is made uniform by directly receiving the compression effect of the press. By both effects that the 3DF and metal fine powder and the like do not exist in the layer of this active material powder 12 and that innumerable opening portion h is formed on the 3DF for Li ions in the electrolyte to easily move to the depth portion of the electrode, Li dendrites are not generated on the negative electrode even in repeated ordinary charge and discharge.

Moreover, in cases for a further thicker electrode, it is preferable to help the permeation of the electrolyte containing sufficient Li ions by forming concavities and convexities on the 3DF surface layer of the enlarged view on the upper right of FIG. 2 (for example, concave portions of the 3DF surface 13) beforehand or covering the same portion with a binder or a thickener or a mixture of those with carbon fine particles (for example, graphene etc.) beforehand resulting in high liquid retention of the electrolyte, as well as to physically inhibit the separation of the active material powder from the electrical contact with the 3DF.

Figure 3:
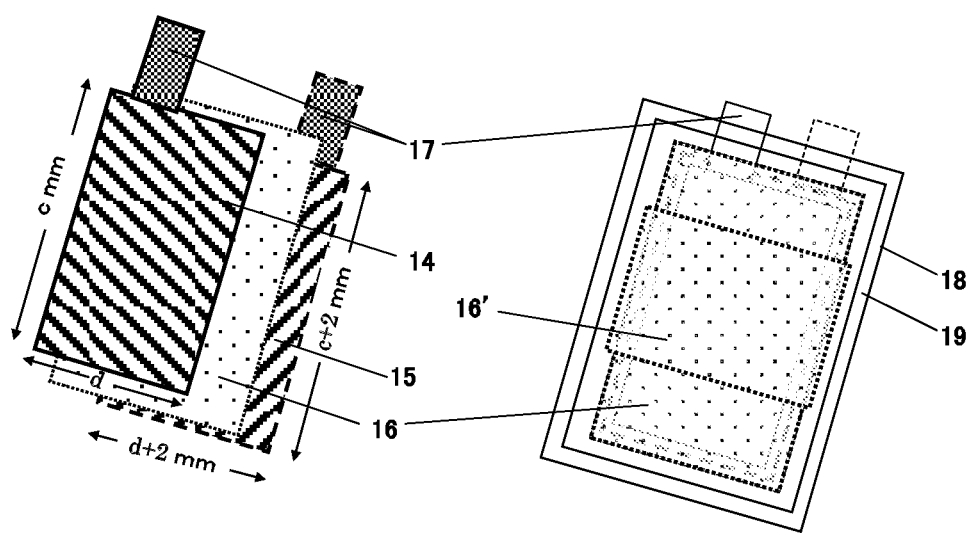
FIG. 3 A schematic view of the laminated LIB in one embodiment of the present invention.

FIG. 3 shows a unit electrode wherein a 3DF-positive electrode 14 and a 3DF-negative electrode 15 with dimensions approximately 1 mm larger both vertically and horizontally of the present invention is overlapped interposing a separator 16 therebetween on the left side of the figure. An example of a laminated type LIB wherein the electrode group plurally laminating this and further being fixed and reinforced 16' by the separator is arranged between a laminated foil 18 with both sides of an Al foil being covered with resin, dried in vacuum atmosphere, subsequently injected with the electrolyte and completely sealed at welding 19 is shown on the right side. The width of an electrode lead 17 is widened as possible not to disturb high rate charge and discharge.

EXAMPLE

Next, specific examples of the present invention will be described.

Example 1

A three-dimensional substrate (3DF) providing innumerable fine concavities and convexities having an opening portion on the tip portion was obtained by passing a commercially available aluminum foil (Al foil) having a thickness of 20 μm through a pair of rollers with innumerable fine protrusions formed on the surface. Adjustment was made for the distance between the concavities and convexities to be approximately 400 μm and the apparent thickness after processing to be 250 μm. Further, the apparent thickness was adjusted to be 200 μm by passing this 3DF through a smooth roller, and a 3DF made from Al (Al-3DF) for a positive electrode was prepared.

Next, the similar operation was performed to a commercially available copper foil (Cu foil) having a thickness of 10 μm, and a 3DF made from Cu (Cu-3DF) for a negative electrode with the same apparent thickness was prepared.

A paste of the positive electrode material was adjusted to make the viscosity according to a B-type viscometer approximately 4,000 cps by mixing a positive electrode active material of a ternary compound system: 90 parts by weight of $Li(Ni_{1/3}Mn_{1/3}Co_{1/3})O_2$ powder and a conductive material: 5 parts by weight of acetylene black with a binding material: 5 parts by weight of a solution dissolving PVdF in a solvent (NMP), and sufficiently agitating while adding some solvent. Additionally, the weight ratio of the positive electrode active material and the conductive material and the binding material after removing the solvent (NMP) was approximately 91:6:3.

A paste of the negative electrode material was adjusted to make the viscosity according to the B-type viscometer approximately 4,000 cps by mixing 87 parts by weight of a graphite (MCMB) powder and a conductive material: 5 parts by weight of acetylene black with a binding material: 8 parts by weight of an aqueous solution dissolving SBR, and sufficiently agitating while adding deionized water. Additionally, the weight ratio of the graphite and the conductive material and the binding material after removing water was approximately 90:7:3.

An electrode with the thickness of approximately 200 μm after drying was obtained by performing operation of the first step coating of the two-step coating process of the present invention to said 3DF made from Al (Al-3DF) with said positive electrode paste, and this was compressed to 150 μm by a press. Next, a positive electrode plate was obtained by compressing an electrode made to be the thickness of approximately 250 μm after performing the second step coating and dried to approximately 200 μm by a press. A unit positive electrode was obtained by welding a Ni foil lead on the tip portion after cutting this electrode into a size of 30×40 mm.

By the similar method, an negative electrode plate with the thickness of approximately 210 μm was obtained by performing the two-step coating of the negative electrode paste to said a 3DF made from Al (Cu-3DF). A unit negative electrode was obtained by welding an Ni foil lead on the tip portion after cutting this electrode into a size of 32×42 mm.

A fixed electrode group was obtained by overlapping these four unit positive electrodes and five unit negative electrodes respectively interposing a separator of a non-woven cloth made of polyester (with alumina fine powder filled inside) having a thickness of 25 μm therebetween, and further rolling the whole with the same separator (a fixing reinforcement 16' in FIG. 3). Using the actual capacity 170 mAh/g of the positive electrode active material, the capacity of the battery was approximately 285 mAh in total of the four unit positive electrodes. The capacity of the negative electrode was approximately 1.2 times of that, which is 340 mAh. Moreover, the thickness of the fixed electrode group rolled with the separator was 2.15 mm.

Next, this electrode group was arranged between a laminated foil with polyamide and polypropylene coated on the front and back sides of an Al foil respectively and the three edges except the edge of the electrode lead was welded (19 of FIG. 3). Subsequently, after being preserved for 2 hours in a vacuum dryer set to 110° C., 1 cc of a commercially available EC/DMC/DEC (1:1:1) electrolyte dissolving $1M-LiPF_6$ was injected. This was completely weld sealed and after charging at 15 mA current up to 0.5V, charging at 30 mA up to 4.2V was performed and a battery which initial charge is completed was obtained. The thickness of this finished battery was approximately 2.3 mm.

Figure 4:
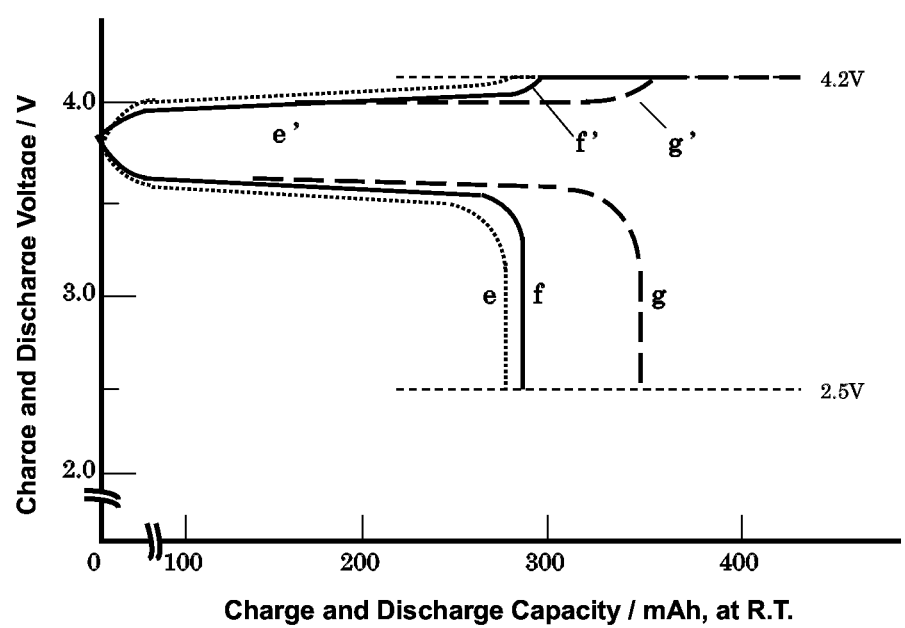
FIG. 4 The charge and discharge property of the laminated LIB in one embodiment of the present invention.
Figure 5:
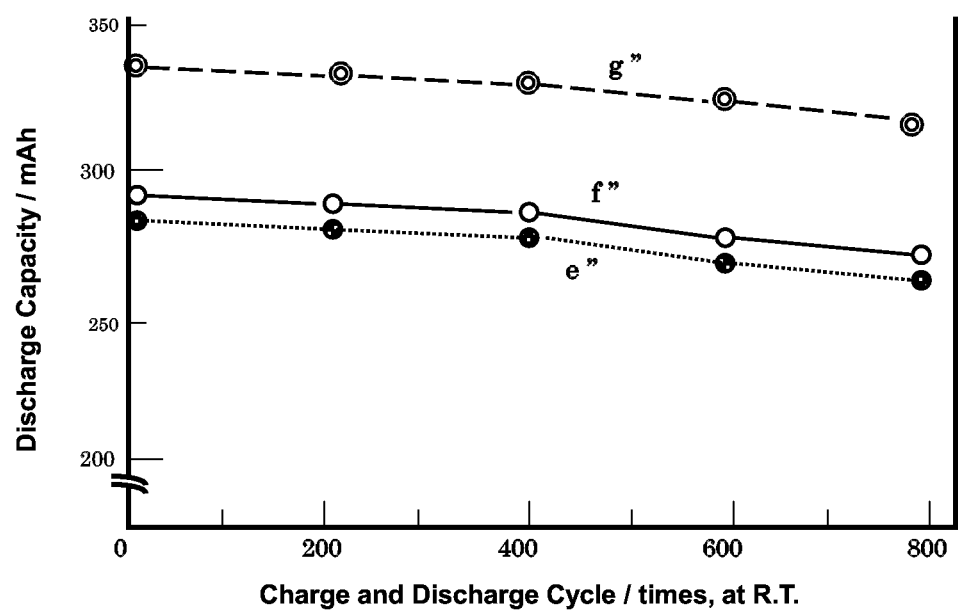
FIG. 5 The charge and discharge cycle property of the laminated LIB in one embodiment of the present invention.

The average curve showing discharge and charge of the battery when 10 cells of this battery are discharged at 150 mA (approximately 0.5C) up to 2.5V and charged at 60 mA (approximately 0.2C) up to 4.2V is shown as f and f' in FIG. 4. Moreover, the average of the result repeating charge and discharge in the same condition at room temperature (R. T.) for 3 cells of the 10 cells optionally selected, is shown as f" in FIG. 5.

The discharge capacity at 150 mA was 285 mAh in average, deterioration in charge and discharge cycle was also small, and no large deterioration was recognized even after 800 cycles.

Example 2

An electrode group with the thickness of approximately 2.6 mm was obtained by overlapping the five positive electrodes and six negative electrodes obtained in Example 1 interposing the same separator therebetween, and further fixing similarly to Example 1 with the same separator. Using the actual capacity 170 mAh/g of the positive electrode active material, the capacity of the battery was approximately 355 mAh in total of the five unit positive electrodes. The capacity of the negative electrode was approximately 1.2 times of that, which is 420 mAh. Next, the thickness of the finished battery which is introduced in a laminated foil and weld sealed in the surrounding was approximately 2.75 mm. This was initially charged by the similar method as Example 1.

The average curve showing discharge and charge of the battery when 10 cells of this battery are discharged at 150 mA (approximately 0.5C) up to 2.5V and charged at 60 mA (approximately 0.2C) up to 4.2V is shown as g and g' respectively in FIG. 4. Moreover, the average of the result repeating charge and discharge in the same condition at room temperature (R. T.) for 3 cells of the 10 cells optionally selected, is shown as g" in FIG. 5.

The discharge capacity at 150 mA was approximately 334 mAh in average, deterioration in charge and discharge cycle was also small, and no large deterioration was recognized even after 800 cycles.

Example 3

After masking a resin film having fine pores to an Al foil with the thickness of 20 μm, etching was performed by immersing in an acid liquid of 35° C. and innumerable micron convex portions were formed on the surface of the foil. Similarly to Example 1, this was roller processed to be three-dimensional and a 3DF with the apparent thickness of 250 μm (S—Al-3DF) was obtained. Further, the apparent thickness was adjusted to be 200 μm by passing this 3DF through smooth rollers, and a surface-treated 3DF made from Al (Al-3DF) for a positive electrode was prepared.

A finished battery with the battery thickness of 2.3 mm was prepared all similarly to Example 1 except using the above S—Al-3DF as the 3DF of the positive electrode of Example 1.

Similarly to Example 1, the average curve showing discharge and charge of the battery when 10 cells of this battery are discharged at 150 mA (approximately 0.5C) up to 2.5V and charged at 60 mA (approximately 0.2C) up to 4.2V was similar to the result shown as f and f' in FIG. 4. Moreover, the result repeating charge and discharge in the same condition at room temperature (R. T.) for 3 cells of the 10 cells optionally selected, was also similar to f" in FIG. 5.

Figure 8:
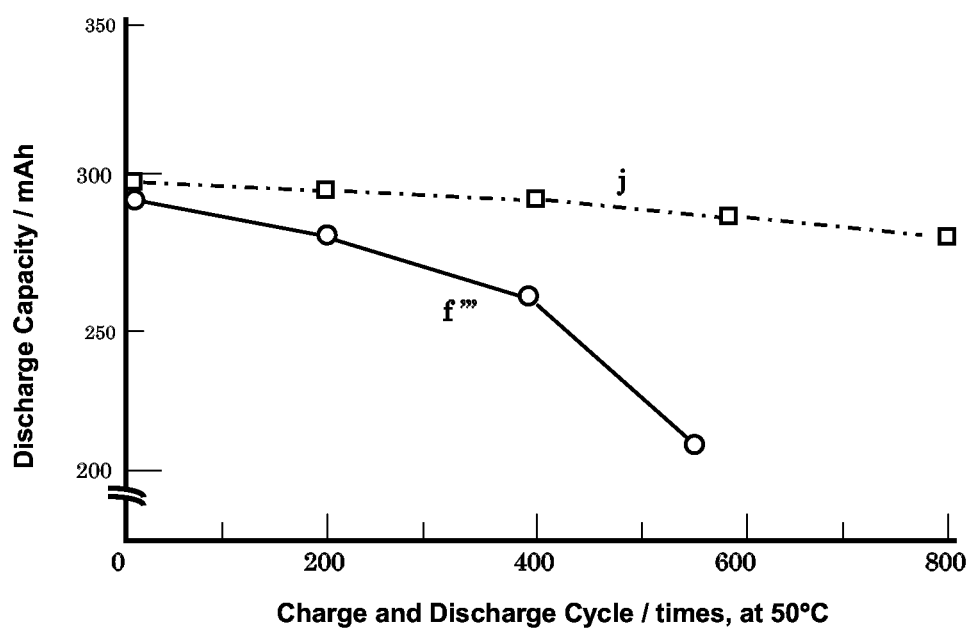
FIG. 8 The charge and discharge cycle property of the laminated LIB in a high temperature atmosphere in one embodiment of the present invention.
Figure 9:
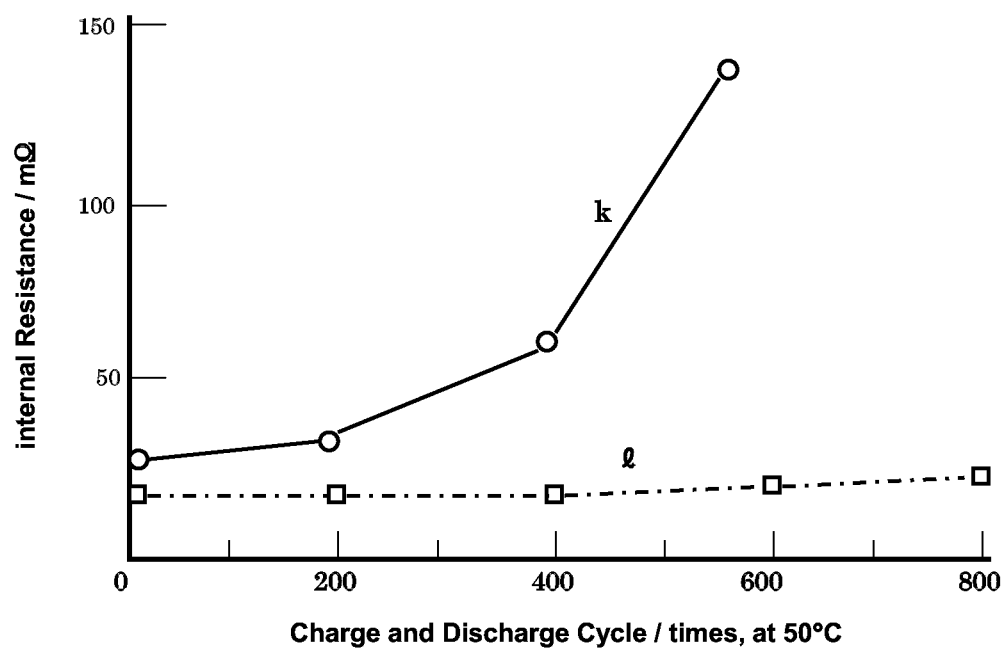
FIG. 9 A relation figure showing the charge and discharge cycle and the change in internal resistance of the laminated LIB in a high temperature atmosphere in one embodiment of the present invention.

Here, the result of other 3 cells being charged and discharged under the same charge and discharge condition in the 50° C. atmosphere is shown in FIG. 8. The result of the battery of Example 1 is shown as f'" and the result of the battery of Example 3 of the present application as j. In contrast with the battery of Example 1 greatly deteriorating near 400 cycles, the battery of Example 3 of the present application had no large deterioration even when progressing 800 cycles. The relation of the charge and discharge cycle and the internal resistance (impedance) at this time is shown in FIG. 9. The result of Example 1 is shown as k and the result of Example 3 of the present application as l.

It is considered that the reason of the increase in internal resistance being small even with the increase in charge and discharge cycle is because that shortage in Li ions at the depth portion of the electrode is not caused even under high temperature due to the electrolyte becoming easy to penetrate into the surface of the 3DF.

Example 4

A finished battery with the battery thickness of 2.35 mm was prepared similarly to Example 1 except using a 3DF which the Al-3DF for a positive electrode of Example 1 is immersed in a mixed solution of 5 parts by weight of fine graphene powder having an average of approximately 100 nm with 95 parts by weight of an 1 wt % aqueous solution containing PTFE and CMC (weight ratio 1:2) and is dried for an hour at 100° C.

Similarly to Example 1, the average curve showing discharge and charge of the battery when 10 cells of this battery are discharged at 150 mA (approximately 0.5C) up to 2.5V and charged at 60 mA (approximately 0.2C) up to 4.2V was similar to the result shown as f and f' in FIG. 4. Moreover, the average of the result repeating charge and discharge in the same condition at room temperature (R. T.) for 3 cells of the 10 cells optionally selected, was also similar to f" in FIG. 5.

Moreover, the result of other 3 cells being charged and discharged under the same charge and discharge condition in the 50° C. atmosphere was similar to the result (j) of charge and discharge cycle of Example 3 in FIG. 8 and the result of the increase of battery internal resistance (I) in FIG. 9.

It may be considered that the reason for this is due to a binder or graphene preventing the separation of the active material powder from the 3DF and maintaining conductivity. However, mainly, it is considered to be because, as the same as in Example 3, that shortage in Li ions at the depth portion of the electrode is not caused even under high temperature due to helping the penetration of the electrolyte.

Comparative Example 1

A commercially available aluminum foil (Al foil) having a thickness of 20 μm was prepared as an electrode substrate for a positive electrode and a commercially available copper foil (Cu foil) having a thickness of 10 μm as an electrode substrate for a negative electrode.

By respectively coating a positive electrode paste and a negative electrode paste similar to Example 1 and performing press after drying to this, a positive electrode thickness: 115 μm and a negative electrode thickness: 125 μm was obtained.

A unit positive electrode was obtained by welding a Ni foil lead on the tip portion after cutting this positive electrode plate into a size of 30×40 mm, and a unit negative electrode was obtained by welding a Ni foil lead on the tip portion after cutting this negative electrode plate into a size of 32×42 mm.

An electrode group with the total thickness of approximately 2.6 mm was obtained by overlapping the eight positive electrodes and nine negative electrodes interposing a separator similar to the Example therebetween, and further fixing by rolling the surrounding with the separator. The total capacity of the eight unit positive electrodes was 285 mAh, and the negative electrode capacity was approximately 1.2 times of that, which is 340 mAh. The thickness of the finished battery which this is introduced in a laminated foil and weld sealed in the surrounding was, similar to Example 2, approximately 2.75 mm. Next, this was initially charged by the similar method as Example 1 and Example 2.

The average curve showing discharge and charge of the battery when 10 cells of this battery are discharged at 150 mA (approximately 0.5C) up to 2.5V and charged at 60 mA (approximately 0.2C) up to 4.2V is shown as e and e' in FIG. 4. Moreover, the result repeating charge and discharge in the same condition at room temperature (R. T.) is shown as e" in FIG. 5. The discharge capacity at 150 mA was approximately 278 mAh in average, deterioration in charge and discharge cycle was small, and no large deterioration was recognized even after 800 cycles.

Comparative Example 2

A positive electrode (thickness: 200 μm) and a negative electrode (thickness: 210 μm) was prepared using the Al-3DF with the apparent thickness after processing of 250 μm described in Example 1 as a substrate for the positive electrode, and similarly, the Cu-3DF with the apparent thickness after processing of 250 μm as a substrate for the negative electrode, respectively coating them with the same active material paste as Example 1 at a time (one-step coating), and undergoing a compression operation. A laminated type LIB was prepared with this similarly to Example 1.

The capacity of the battery was, similarly to Example 1, the positive electrode: approximately 285 mAh, the negative electrode: 340 mAh. Moreover, the thickness of the electrode group after being fixed by rolling a separator to the electrode group was 2.15 mm, and the thickness of the finished battery was approximately 2.3 mm.

Figure 6:
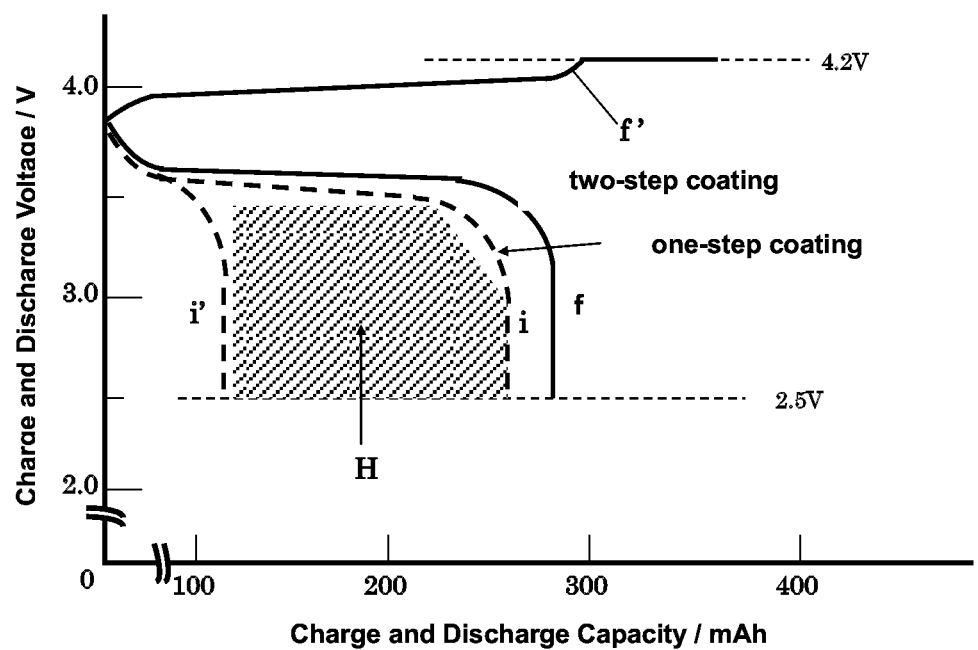
FIG. 6 The charge and discharge property of the two-step coating laminated LIB and the one-step coating laminated LIB in one embodiment of the present invention.

The discharge property of the 10 cells of this battery compared with the battery f of Example 1 is shown in FIG. 6. Since the battery of the Comparative Example 2 had a large range in discharge capacity, the battery of maximum capacity is shown as i, and the battery of minimum capacity as i'. The remaining eight cells were between said i and i'. That is, in the range of H in the figure.

Figure 7:
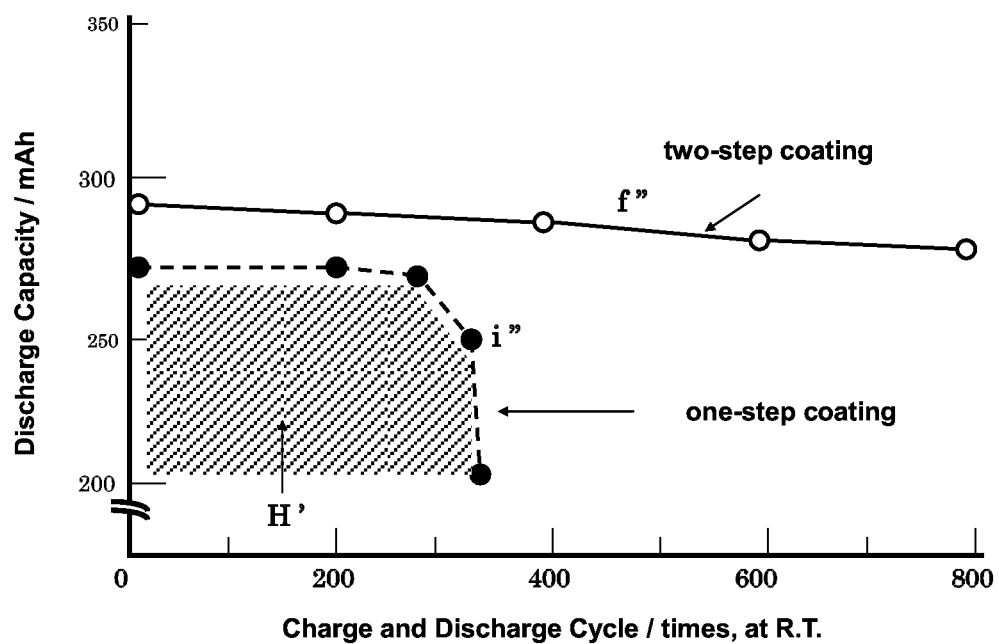
FIG. 7 The charge and discharge cycle property of the two-step coating laminated LIB and the one-step coating laminated LIB in one embodiment of the present invention.

Moreover, the result of the charge and discharge cycle property at room temperature is shown in FIG. 7. Compared with the 3 cells of the battery of Example 1 (f"), deterioration in discharge capacity suddenly occurred from near 300 cycles even in the most favorable property (i"). The other two cells of the battery were in the range of H'.

It is considered that the battery employing the one-step coating 3DF electrode of the Comparative Example 2 caused such results because Li dendrites are generated during charge and discharge due to metal fine powder and the like mixed into the active material paste during coating existing near the surface layer of the electrode and/or the tip of the fine protrusions of the 3DF exposing to the electrode surface.

As mentioned above, the thick electrode of the present invention, in other words, the thick positive and negative electrodes obtained by the two-step coating process, wherein the three-dimensional substrate (3DF) is uniformly filled with the active material while removing air and dried, then coated with the new active material on the surface and dried was applied to laminated type LIBs. As a result, the micro short circuit easily caused in the one-step coating process could be prevented. Together with this, compared with LIBs of the same type using the conventional thin electrode which the metal foil is coated with an active material and dried, it became approximately 15% smaller in size when the battery capacity is the same and a battery of approximately 20% high in capacity when the volume is the same was obtainable with the number of electrodes constituting the battery shown in Example 1, Example 2, and Comparative Example 1.

The employment of the thick electrode as the present invention decreases the number of electrodes in both Example 1 and Example 2, thereby simplifies the battery structure together with shortening the manufacturing time of the battery per cell, and therefore leads to cost reduction.

In the present invention, further to this effect, compared to the deviation from the central arrangement of the electrode of the metal foil in the electrode using a conventional metal foil resulting in defective electrodes, the present invention has no problem though some position deviation from the central arrangement of the electrode occurs to the 3DF due to Li ions being capable of moving through the fine and innumerable opening portions of the 3DF. Therefore, defective rate reduction when manufacturing electrodes can be expected. Furthermore, since the employment of the thick electrode widens the distance between the electrode lead and the counter electrode and greatly reduces short circuit of the battery caused by vibration, reliability improves.

In the present application, electrodes using a 3DF and batteries using same with respect to secondary batteries, particularly laminated type LIBs was described, but other than cylindrical type LIBs or square-type LIBs, the idea of the invention can be widely applied to electrodes for secondary batteries such as Ni/MH batteries and electrochemical applied products such as capacitors and products using same.

Especially, the present application is applied to a method for manufacturing electrodes using 3DF for electrochemical applied products as set forth in claim 1, wherein the method for manufacturing is for the positive electrode and/or the negative electrode of electrochemical applied products with an electrode group contained and sealed in a bottomed cylindrical can, the electrode group being a long hoop state positive electrode and negative electrode spirally-rolled interposing a separator therebetween or a square plate shaped positive electrode and negative electrode laminated interposing a separator therebetween, or of electrochemical applied products with said laminated electrode group contained and sealed between a metal foil and a laminated foil of synthetic resin.

What is claimed is:

1. A method for manufacturing electrodes using a three-dimensional substrate (hereinafter "3DF") for electrochemical applied products, wherein the electrodes are a positive electrode and/or a negative electrode, the method comprising:

coating a paste inside and/or on a 3DF comprising a metal foil having innumerable fine hollow protrusions having an opening portion on the tip portion arranged on the front and back sides of the metal foil, wherein the coating of the paste inside and/or on the 3DF has two-steps comprising:

a first step coating process of filling a first paste inside and/or on the 3DF, wherein the first paste includes an active material powder, a binder, a solvent, and a metal fine powder generated during the formation of the 3DF which adheres to the 3DF and is mixed into the first paste, while removing air inside the 3DF to form a first coated 3DF, and a second step coating process of coating a second paste on the front and back sides of the first coated 3DF obtained by the first step to form an electrode, wherein the second paste includes the active material powder, the binder, and the solvent, wherein the active material powder of the first paste is the same as the active material powder of the second paste.

2. The method for manufacturing electrodes using the 3DF for electrochemical applied products as set forth in claim 1, wherein: the second paste does not include the metal fine powder generated during the processing of the 3DF.

3. The method for manufacturing electrodes using the 3DF for electrochemical applied products as set forth in claim 1, wherein:
the first paste includes dust in the air adhered to the 3DF;
the second paste does not include the metal fine powder generated during the processing of the 3DF; and
the second paste does not include dust in the air adhered to the 3DF.

4. The method for manufacturing electrodes using the 3DF for electrochemical applied products as set forth in claim 1, wherein the binder of the first paste is the same as the binder of the second paste.

5. The method for manufacturing electrodes using the 3DF for electrochemical applied products as set forth in claim 1, wherein the solvent of the first paste is the same as the solvent of the second paste.

6. The method for manufacturing electrodes using the 3DF for electrochemical applied products as set forth in claim 1, wherein the active material powder of the first paste is the same as the active material powder of the second paste, the binder of the first paste is the same as the binder of the second paste, and the solvent of the first paste is the same as the solvent of the second paste.

7. The method for manufacturing electrodes using the 3DF for electrochemical applied products as set forth in claim 1, wherein the method for manufacturing is for the positive electrode and/or the negative electrode of electrochemical applied products with the electrode group contained and sealed in a bottomed cylindrical can, the electrode group being the positive electrode and negative electrode spirally-rolled interposing a separator therebetween or a square plate shaped positive electrode and negative electrode laminated interposing a separator therebetween, or of electrochemical applied products with said laminated electrode group contained and sealed between a metal foil and a laminated foil of synthetic resin,
said positive electrode and/or said negative electrode
(a) is filled and coated respectively with the active material powder (including a material absorbing a reactant) or a powder of an electrical double-layer formation in an internal space portion and on a surface of the 3DF, and
(b) comprises being the process of filling the first paste to the internal space portion of the 3DF of (a),
(c) being a process of compressing after drying the first coated 3DF obtained by the first step coating process,
(d) being coated by the process of coating the second paste on the front and back sides of the first coated 3DF after said compression, and
(e) being a process of compressing to a desired thickness after drying the electrode(s) obtained by the second step coating process.

8. The method for manufacturing electrodes using the 3DF for electrochemical applied products as set forth in claim 1, wherein extra first paste is removed by passing the first coated 3DF through a slit space after the first step coating process and before the second step coating process.

9. The method for manufacturing electrodes using the 3DF for electrochemical applied products as set forth in claim 1, wherein the second step coating process comprises immersing the first coated 3DF obtained by the first step coating process in a paste tank or coating the second paste onto both sides of the first coated 3DF with coaters.

10. The method for manufacturing electrodes using the 3DF for electrochemical applied products as set forth in claim 1, wherein extra second paste is removed by passing the electrode through a slit space after the second step coating process.

11. The method for manufacturing electrodes using the 3DF for electrochemical applied products as set forth in claim 1, wherein the method for manufacturing is for the positive electrode and/or the negative electrode of electrochemical applied products with an electrode group contained and sealed in a bottomed cylindrical can, the electrode group being a positive electrode and negative electrode spirally-rolled interposing a separator therebetween or a square plate shaped positive electrode and negative electrode laminated interposing a separator therebetween, or of electrochemical applied products with said laminated electrode group contained and sealed between a metal foil and a laminated foil of synthetic resin,
said positive electrode and/or said negative electrode
(a) is filled and coated respectively with the active material powder (including a material absorbing a reactant) or a powder of an electrical double-layer formation in an internal space portion and on a surface of the 3DF, and
(b) has the first step coating process of filling the first paste to the internal space portion of the 3DF of (a) and the second step coating process of coating the second paste on the front and back sides of the first coated 3DF obtained by the first step.

12. The method for manufacturing electrodes using the 3DF for electrochemical applied products as set forth in claim 1, wherein ultrafine innumerable concave and convex portions or innumerable concave portions are formed on a surface of said 3DF prior to the first step coating process.

13. The method for manufacturing electrodes using the 3DF for electrochemical applied products as set forth in claim 1, wherein a surface of said 3DF is covered with a binder or a thickener or a mixture thereof used in positive and negative electrodes, or a mixture of the binder or the thickener with carbon fine particles prior to the first step coating process.

14. The method for manufacturing electrodes using the 3DF for electrochemical applied products as set forth in claim 1, wherein the filling of the first paste in said first step coating process includes passing the first paste through from one side of the 3DF to the opposite side.

15. The method for manufacturing electrodes using the 3DF for electrochemical applied products as set forth in claim 7, wherein the filling of the first paste in said first step coating process includes passing the first paste through from one side of the 3DF to the opposite side.

16. The method for manufacturing electrodes using the 3DF for electrochemical applied products as set forth in claim 7, wherein ultrafine innumerable concave and convex portions or innumerable concave portions are formed on a surface of said 3DF prior to the first step coating process.

17. The method for manufacturing electrodes using the 3DF for electrochemical applied products as set forth in claim 7, wherein a surface of said 3DF is covered with a binder or a thickener or a mixture thereof used in positive and negative electrodes, or a mixture of the binder or the thickener with carbon fine particles prior to the first step coating process.

* * * * *